US011472392B2

(12) United States Patent
Biller

(10) Patent No.: US 11,472,392 B2
(45) Date of Patent: Oct. 18, 2022

(54) METHOD FOR OPERATING A BRAKE SYSTEM FOR MOTOR VEHICLES, AND BRAKE SYSTEM

(71) Applicant: Continental Teves AG & Co OHG, Frankfurt am Main (DE)

(72) Inventor: Harald Biller, Eschborn (DE)

(73) Assignee: CONTINENTAL AUTOMOTIVE SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 16/886,294

(22) Filed: May 28, 2020

(65) Prior Publication Data

US 2020/0290586 A1    Sep. 17, 2020

Related U.S. Application Data

(63) Continuation of application No. PCT/EP2018/081385, filed on Nov. 15, 2018.

(30) Foreign Application Priority Data

Dec. 1, 2017 (DE) ...................... 10 2017 221 723.5

(51) Int. Cl.
  *B60T 13/74*   (2006.01)
  *B60T 7/04*    (2006.01)
  (Continued)

(52) U.S. Cl.
  CPC ............ *B60T 13/745* (2013.01); *B60T 7/042* (2013.01); *B60T 8/17* (2013.01); *B60T 13/145* (2013.01);
  (Continued)

(58) Field of Classification Search
  CPC .................. B60T 13/686; B60T 13/745; B60T 2270/403; B60T 2270/406; B60T 17/225
  See application file for complete search history.

(56) References Cited

U.S. PATENT DOCUMENTS 10,124,783 B2 * 11/2018 Spieker ................. B60T 17/221
2007/0108836 A1   5/2007 Feigel
(Continued)

FOREIGN PATENT DOCUMENTS

CN    101269657 A    9/2008
CN    102822025 A    12/2012
(Continued)

OTHER PUBLICATIONS

International Search Report and Written Opinion dated Feb. 14, 2019 from corresponding International Patent Application No. PCT/EP2018/081385.
(Continued)

*Primary Examiner* — Bradley T King

(57) ABSTRACT

A method for operating a brake system for motor vehicles, comprising a master brake cylinder actuable by a brake pedal, an electrically controllable pressure provision device, a pressure medium reservoir tank, from which the master brake cylinder and the pressure provision device are supplied with pressure medium, and at least two hydraulically actuable wheel brakes and at least one electrically actuable inlet valve per wheel brake, wherein the wheel brakes are actuable either by the master brake cylinder or by the pressure provision device, the pressure medium reservoir tank is monitored by a device for determining a level of the pressure medium, wherein the wheel brakes are divided into at least one first wheel brake group and one second wheel brake group, and wherein the inlet valves of the first wheel brake group are closed when the determined level falls below a first limit value ($s_1$).

18 Claims, 2 Drawing Sheets

(51) Int. Cl.
  *B60T 8/17* (2006.01)
  *B60T 13/14* (2006.01)
  *B60T 13/62* (2006.01)
  *B60T 13/66* (2006.01)
  *B60T 13/68* (2006.01)
  *B60T 17/22* (2006.01)

(52) U.S. Cl.
  CPC ............ *B60T 13/62* (2013.01); *B60T 13/662* (2013.01); *B60T 13/686* (2013.01); *B60T 17/221* (2013.01); *B60T 17/225* (2013.01); *B60T 2270/402* (2013.01); *B60T 2270/404* (2013.01); *B60T 2270/82* (2013.01)

(56) References Cited

U.S. PATENT DOCUMENTS

| | | |
|---|---|---|
| 2008/0234909 A1 | 9/2008 | Iwasaki |
| 2010/0153026 A1 | 6/2010 | Bredau |
| 2011/0140508 A1 | 6/2011 | Cetinkaya |
| 2012/0038209 A1 | 2/2012 | Yamamoto |
| 2012/0299367 A1 | 11/2012 | Florian |
| 2013/0119752 A1 | 5/2013 | Roll et al. |
| 2013/0218407 A1 | 8/2013 | Marco |
| 2013/0320750 A1 | 12/2013 | Kim |
| 2015/0025767 A1 | 1/2015 | Feigel |
| 2015/0224972 A1 | 8/2015 | Feigel |
| 2015/0353067 A1 | 12/2015 | Knechtges |
| 2017/0282877 A1* | 10/2017 | Besier ................ B60T 13/142 |
| 2018/0118183 A1* | 5/2018 | Spieker .................. B60T 8/34 |
| 2018/0297574 A1* | 10/2018 | Zimmermann ....... B60T 13/167 |
| 2020/0180580 A1* | 6/2020 | Kim ...................... B60T 13/58 |
| 2021/0146906 A1* | 5/2021 | Ganzel ................ G01M 3/2876 |
| 2021/0291800 A1* | 9/2021 | Jesse ........................ B60T 8/94 |
| 2021/0318199 A1* | 10/2021 | Rosenberg ........... B60T 17/221 |

FOREIGN PATENT DOCUMENTS

| | | |
|---|---|---|
| CN | 103129544 A | 6/2013 |
| CN | 104640752 A | 5/2015 |
| CN | 104981385 A | 10/2015 |
| DE | 112008002155 | 12/1899 |
| DE | 102009047622 A1 | 6/2011 |
| DE | 102011081240 A1 | 4/2012 |
| DE | 102013203594 A1 | 9/2013 |
| DE | 102012219390 A1 | 4/2014 |
| DE | 102014224205 A1 | 6/2016 |
| DE | 102016200614 A1 | 7/2017 |
| EP | 2047118 A1 | 4/2009 |
| FR | 2958605 A1 | 10/2011 |
| KR | 20130130717 A | 12/2013 |
| KR | 20140132752 A | 11/2014 |
| WO | 2005014352 A1 | 2/2005 |

OTHER PUBLICATIONS

German Search Report dated Aug. 26, 2021 for the counterpart German Patent Application No. 10 2017 221 723.5.
Korean Notice of Allowance dated Nov. 1, 2021 for the counterpart Korean Patent Application No. 10-2020-7014772.
China First Office Action dated Nov. 24, 2021 for the counterpart Chinese Patent Application No. 201880075763.0.
Chinese Office Action dated Jun. 17, 2022 for the counterpart Chinese Patent Application No. 201880076763.0.

* cited by examiner

US 11,472,392 B2

METHOD FOR OPERATING A BRAKE SYSTEM FOR MOTOR VEHICLES, AND BRAKE SYSTEM

RELATED APPLICATIONS

This application claims priority to PCT International Application No. PCT/EP2018/081385, filed Nov. 15, 2018, which claims priority to German Patent Application No. DE 10 2017 221 723.5, filed Dec. 1, 2017, wherein the contents of such applicants are incorporated herein by reference.

TECHNICAL FIELD

A method for operating a brake system for motor vehicles, which comprises a master brake cylinder actuable by a brake pedal, an electrically controllable pressure provision device, a pressure medium reservoir tank from which the master brake cylinder and the pressure provision device are supplied with pressure medium.

TECHNICAL BACKGROUND

DE 10 2012 219 390 A1 discloses a brake system for motor vehicles, which can be operated in a "brake-by-wire" operating mode, in which wheel brakes of the motor vehicle are actuated with pressure medium from an electrically controllable pressure provision device. The brake system can also be operated in a fallback operating mode, in which the wheel brakes are operated with pressure medium from a master cylinder.

In such a brake system, leaks can occur which are so small that they cannot be determined and located by means of a volume measurement in the pressure provision device during operation.

What is needed is to provide a method for operating a brake system, with which the brake system is operated with increased safety in the event of a leak.

BRIEF DESCRIPTION OF THE FIGURES

In the figures, schematically.

DETAILED DESCRIPTION OF THE FIGURES

Figure 1:
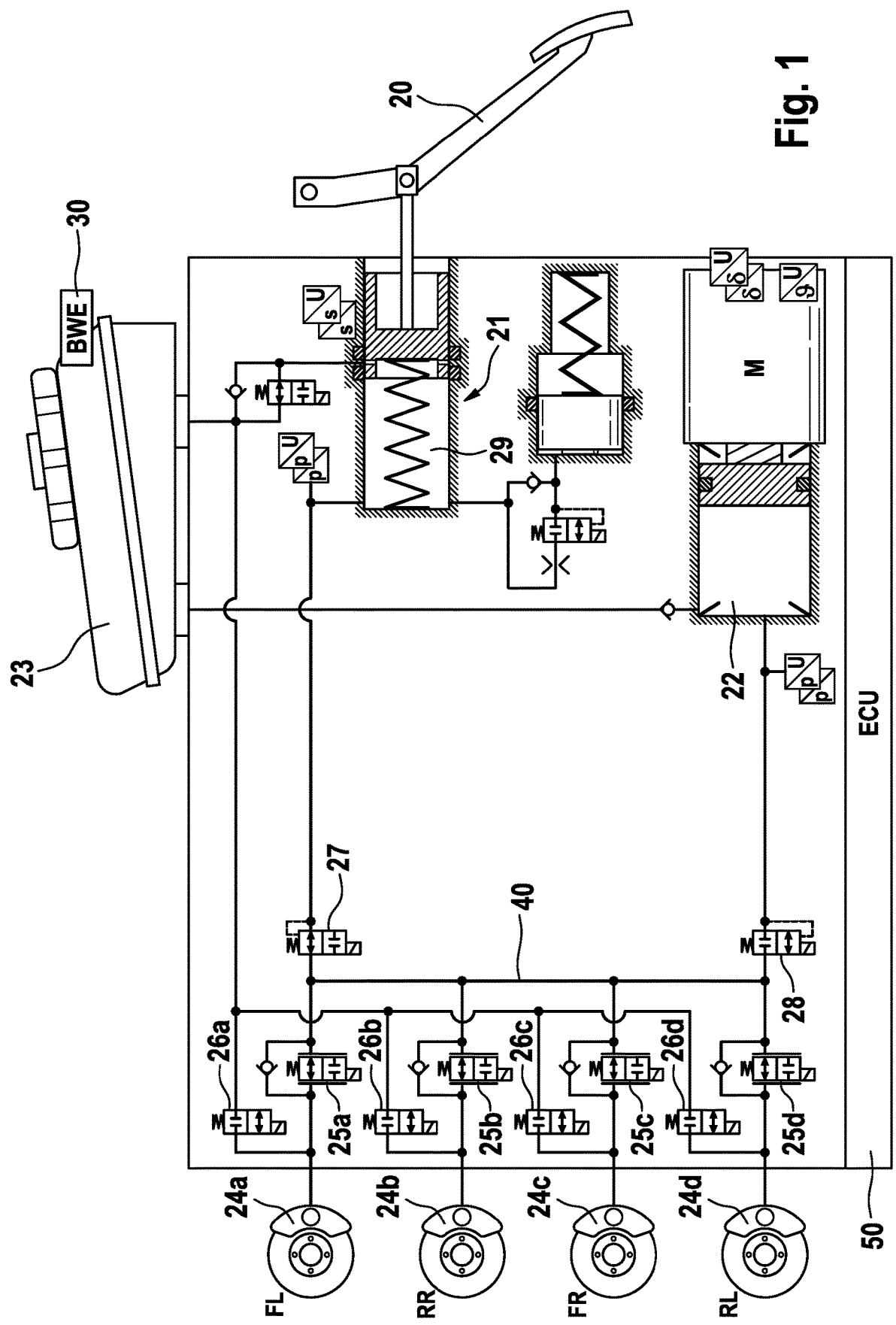
FIG. 1 shows an exemplary brake system.

FIG. 1 shows an exemplary brake system. The brake system comprises a master brake cylinder 21 with at least one pressure chamber 29. The master brake cylinder is actuated via a brake pedal 20 and is connected to the wheel brakes 24a, 24b, 24c, 24d via at least one isolating valve 27. The isolating valve 27 is advantageously designed to be open when de-energized. Each wheel brake is hydraulically separable individually by switching an assigned inlet valve 25a, 25b, 25c, 25d.

According to the example, the master brake cylinder 21 comprises a single pressure chamber 29, which is connected to a brake supply line 40 via the isolating valve 27. The wheel brakes 24a, 24b, 24c and 24d are in turn connected to the brake supply line 40 via the inlet valve 25a, 25b, 25c, 25d, respectively. The wheel brakes 24a, 24b, 24c, 24d are actuable via these connections by pressure medium from the master brake cylinder 21.

The brake system also includes a pressure provision device 22, by which the wheel brakes can also be supplied with pressure medium. For this purpose, the pressure provision device 22 is connected to the wheel brakes 24a, 24b, 24c, 24d via at least one activation valve 28. The activation valve 28 is advantageously designed to be closed when de-energized.

For example, the pressure provision device 22 is also connected via the activation valve 28 to the brake supply line 40, to which the wheel brakes are connected.

The brake system can be operated in a "by-wire" operating mode, in which the master brake cylinder 21 is hydraulically separated from the wheel brakes 24a, 24b, 24c, 24d, and braking is carried out by pressure medium from the pressure provision device 22.

The brake system comprises a pressure medium reservoir tank 23, which is equipped with a device 30 for determining a level of the pressure medium. Both the master brake cylinder 21 and the pressure provision device 22 are supplied with pressure medium from the pressure medium reservoir tank 23. The pressure medium reservoir tank 23 is advantageously under atmospheric pressure.

According to a first exemplary embodiment, the device 30 for determining a level is designed such that continuous values of the level p are determined. This is done, for example, by a sensor that measures the height of the filling level.

According to a second exemplary embodiment, the device 30 for determining a level is designed such that a drop in the level below a predetermined value or a plurality of discrete predetermined values is determined. This can be implemented, for example, by Hall sensors or by a sensor with one or more so-called reed contacts, by which a drop in the level below the location of the respective reed contact is determined.

The wheel brakes 24a, 24b, 24c, 24d are separably connected to the pressure medium reservoir tank 23, for example, via a respective outlet valve 26a, 26b, 26c, 26d.

The "by-wire" operating mode is advantageously used during normal operation of the brake system. The brake system can also be operated in a first fallback mode, in which the pressure provision device 22 is taken out of operation and brake pressure is provided exclusively by the master brake cylinder 21. The brake system is also operable in a second fallback operating mode, in which the master brake cylinder 21 is continuously separated from the wheel brakes 24a, 24b, 24c, 24d and brake pressure is provided exclusively by the pressure provision device 22. Advantageously, the pressure medium reservoir tank 23 is divided into two chambers, which are separated by a partition wall, and therefore complete emptying of the pressure medium reservoir tank 23 is prevented.

In the first and/or the second fallback operating mode, the outlet valves 26a, 26b, 26c, 26d are optionally closed.

The brake system furthermore comprises a control unit 50, which controls the operation of the brake system.

Figure 2:
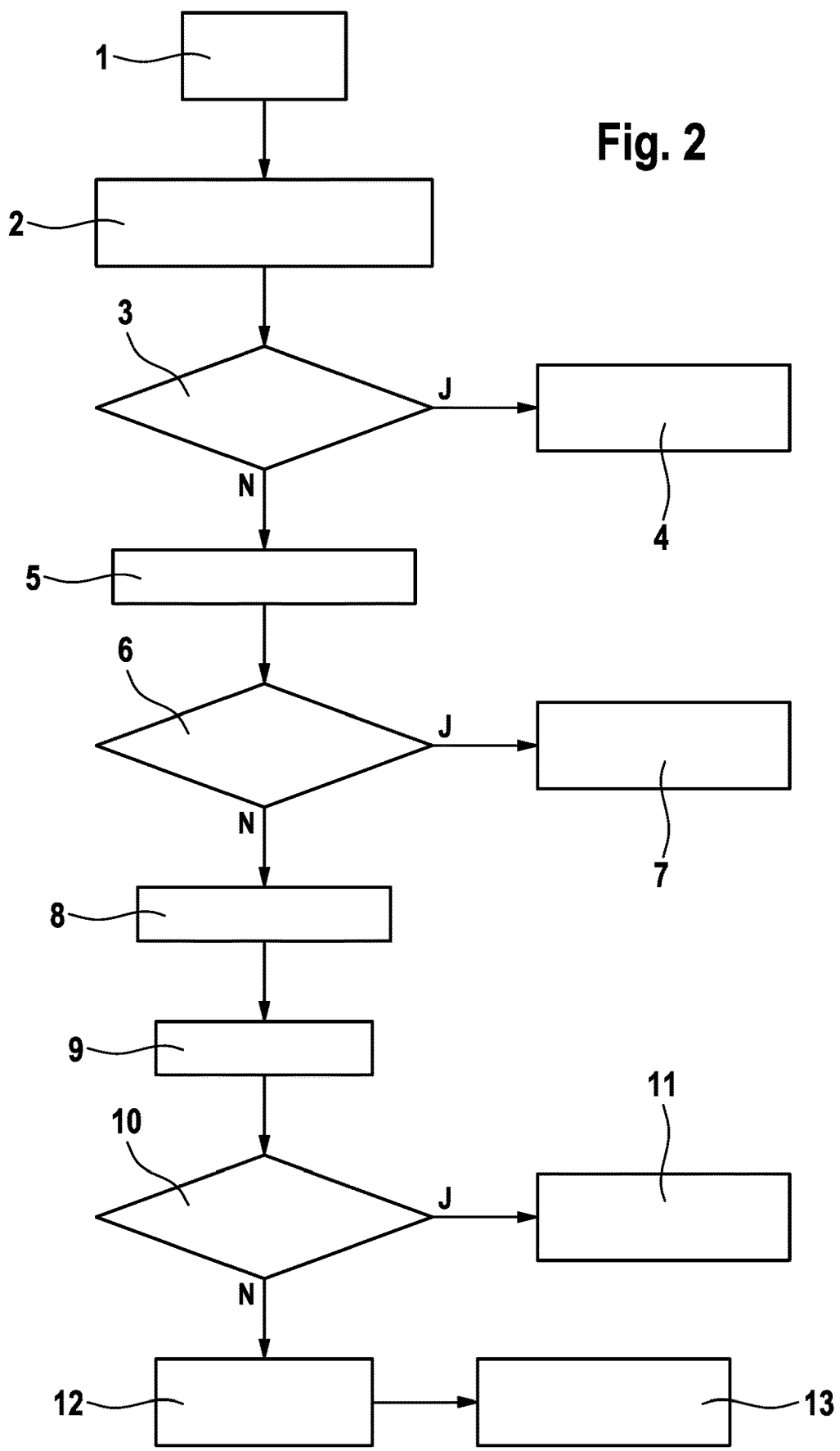
FIG. 2 shows a flow diagram of an exemplary method.

FIG. 2 shows a flow diagram of an exemplary method. The method will be explained in more detail using the exemplary brake system of FIG. 1. The method begins in block 1 when the device 30 for determining a level of the pressure medium in the pressure medium reservoir tank 23 measures a level which is below a first limit value s1.

According to a first exemplary embodiment, the device 30 for determining a level of the pressure medium is designed here such that a level p of the pressure medium is measured continuously by a sensor. The measured value p is transmitted to the control unit 50, which compares the value with the first limit value s1. If the measured value p is lower than the first limit value s1, a drop in the level below the first limit value s1 is deemed to have been determined and the method is continued with block 2.

According to a second exemplary embodiment, the device 30 for determining a level of the pressure medium is designed such that a drop in the level below a predetermined value or a plurality of discrete predetermined values is determined. The device for determining a level advantageously comprises at least one first sensor, which is designed to recognize whether pressure medium is located at a specific first measuring point. The sensor transmits the identified status (pressure medium/no pressure medium at the measuring point) to the control unit 50. Alternatively, the sensor transmits only an identified absence of pressure medium to the control unit 50. Advantageously, the signal from the sensor is debounced by the control unit 50 in order to prevent identification of a false positive due to sloshing pressure medium. If it is determined by the first sensor that there is no pressure medium at the first measuring point, a drop in the level below the first limit value s1, which corresponds to the height of the measuring point, is deemed to have been determined and the method is continued with block 2.

In block 2 of the method, the driver is warned that a pressure medium loss has been determined. In addition, the inlet valves of a first and a second wheel brake of the wheel brakes are closed. The first and second wheel brake are advantageously arranged here on opposite sides of the vehicle, for example on a vehicle diagonal or on a vehicle axle.

The inlet valves of the third and fourth wheel brake advantageously remain open.

For example, the inlet valve 25c of the front right (FR) wheel brake 24c and the inlet valve 25d of the rear left (RL) wheel brake 24d are closed. The inlet valves 25a, 25b of the front left (FL) and rear right (RR) wheel brakes 24a, 24b remain open.

In one or more embodiments, the outlet valves 26a, 26b, 26c, 26d of all the wheel brakes are likewise closed in block 2, as a result of which the return lines are disconnected.

The method is continued with block 3. The further development of the level of the pressure medium is monitored. If a continuously measured level p is transmitted to the control unit 50, the measured level p is compared with a second limit value s2. On the other hand, the device for determining a level comprises at least one second sensor, which is designed to detect whether pressure medium is located at a specific second measuring point. The height of the second measuring point in the pressure medium reservoir tank corresponds to a second limit value s2. The second limit value s2 is in any case lower than the first limit value s1. If the measured level p falls below the second limit value s2 or if there is no pressure medium at the second measuring point, the procedure continues with block 5. If, by contrast, the measured level p remains above the second limit value s2, in particular during a predetermined first time period T1, or if brake fluid continues to be located at the second measuring point, in particular during a predetermined first time period T1, the procedure continues with block 4.

In block 4, the leak is considered to be localized in the area of the first or second wheel brake. The brake system continues to be operated with the first and second inlet valves 25c, 25d closed, advantageously until the leak is repaired or the brake system is serviced.

The area of a wheel brake is advantageously understood to mean the wheel brake itself, and hydraulic lines between the inlet valve of the wheel brake and the wheel brake and hydraulic lines between the wheel brake and the outlet valve of the wheel brake. Similarly, sections that are hydraulically connected to the wheel brake and are not separable from the wheel brake by the inlet valve or outlet valve can be assigned to the area of the wheel brake.

In block 5, the inlet valves of the first and the second wheel brake are opened and the inlet valves of the third and the fourth wheel brake of the wheel brakes are closed. The method continues with block 6.

For example, the inlet valve 25a of the front left (FL) wheel brake 24a and the inlet valve 25b of the rear right (RR) wheel brake 24b are closed. The inlet valves 25c, 25d of the front right (FR) and rear left (RL) wheel brakes 24c, 24d remain open.

In block 6, the fall of the level below a third limit value s3 (or below a third measuring point) is monitored analogously to block 3. If the level falls below the third limit value s3, the procedure continues with block 8, otherwise in block 7 the leak is deemed to be located in the area of the third or fourth wheel brake. The brake system continues to be operated with the inlet valves of the third and fourth wheel brakes closed, advantageously until the leak is repaired or the brake system is serviced.

In block 8 it is established that the leak is located neither in the area of the first and second wheel brakes (24c, 24d), nor in the area of the third and fourth wheel brakes (24a, 24b). It is concluded from this that the leak is in the area of the master brake cylinder 21 or in the area of the pressure provision device 22.

A diagnostic routine is then carried out in block 8. During the diagnostic routine, the inlet valves 24a, 24b, 24c, 24d of all the wheel brakes, the isolating valve 27 and the activation valve 28 are closed and pressure is built up by the pressure provision device 22. A leak in the area of the pressure provision device 22 and in the brake line between the pressure provision device 22 and the activation valve 28 can be identified by this diagnostic routine.

In block 10, the further procedure is decided depending on the result of the diagnostic routine. If a leak in the area of the pressure provision device 22 was concluded, the procedure continues with block 11, otherwise with block 12. In block 11, a so-called de-energized fallback operating mode is entered. The brake system is operated here in a first fallback operating mode, in which the pressure provision device 22 is separated from all the wheel brakes 24a, 24b, 24c, 24d and the wheel brakes 24a, 24b, 24c, 24d are actuated by pressure medium from the master brake cylinder 21. The separation from the wheel brakes is advantageously carried out by closing the activation valve 28.

In block 12, it is assumed on the basis of the principle of exclusion that the leak is located in the area of the master brake cylinder 21. The method continues with block 12, in which the brake system is operated in a second fallback operating mode, in which the wheel brakes 24a, 24b, 24c, 24d are actuated by pressure medium from the pressure provision device 22, and the master brake cylinder 21 of all the wheel brakes 24a, 24b, 24c, 24d is permanently disconnected. The outlet valves 26a, 26b, 26c, 26d are not opened in the second fallback operating mode. The separation is optionally carried out by closing the isolating valve 27.

A further exemplary method is described below.

A multi-stage device for determining a level of the pressure medium in the pressure medium reservoir tank (tank warning device) or a device for the continuous measurement of the liquid level in the pressure medium reservoir tank is used. When the tank warning device is activated for the first time, the driver is warned in red and the inlet valves of a diagonal or of an axis are permanently closed.

If the liquid level in the tank does not drop any further, the leak is sufficiently localized and mitigated. Otherwise, the two closed inlet valves are opened and the other two inlet valves are closed.

If the liquid level in the tank drops even further, there has to be an external leak in the master cylinder or in the pressure provision device (linear actuator) because a double fault is not anticipated. A diagnostic routine in which the isolating valve (driver isolating valve), the activation valve and the inlet valves are closed and pressure is built up in the linear actuator can be used to decide whether there is a leak in the linear actuator.

If this is the case, the system goes into a de-energized fallback level. Otherwise, the leak has to be in the master cylinder and the system remains in the "by-wire" operating mode, in which pressure medium for the wheel brakes is provided by the linear actuator. However, the outlet valves may no longer be opened to avoid brake fluid from being displaced out of the tank chamber of the linear actuator into that of the master cylinder.

The embodiments are based on the idea that the wheel brakes are divided into at least one first wheel brake group and one second wheel brake group. The pressure reservoir tank is monitored for a possible leak by determining a level of the pressure medium in the pressure medium reservoir tank and, if the level drops below a limit value, the inlet valves of the first wheel brake group are closed.

This has the advantage that the leak can be localized and further loss of pressure medium is prevented. If the leak is located in a now separated area (e.g. brake line between the respective inlet valve and the first wheel brake group or on a wheel brake of the first wheel brake group itself), the separation prevents a further loss and the brake system can continue to operate in this configuration, ensuring a braking action.

Optionally, the inlet valves of only the first wheel brake group are closed, while the inlet valves of the second wheel brake group remain open.

The brake system optionally comprises at least four wheel brakes and the first wheel brake group comprises a first and a second wheel brake of the wheel brakes.

The second wheel brake group optionally comprises a third and a fourth wheel brake of the at least four wheel brakes.

The brake system is optionally activatable both by the vehicle driver and independently of the vehicle driver in what is referred to as a "brake-by-wire" mode, in which the wheel brakes are actuated by pressure medium from the pressure provision device, in which case the master brake cylinder is separated from the wheel brakes. The brake system is optionally also operable in at least one fallback operating mode, in which the wheel brakes are actuated by pressure medium from the master brake cylinder.

The first and the second wheel brakes are optionally arranged on a common motor vehicle axle or on a motor vehicle diagonal. The first and the second wheel brake are thus arranged on opposite sides of the vehicle. This has the advantage that, when the first and the second wheel brake are separated by the remaining wheel brakes, braking force is still generated on both sides of the vehicle.

Optionally, the inlet valves of the first wheel brake group are opened and the inlet valves of the second wheel brake group are closed when the level falls below a second limit value, which is lower than the first limit value. As above, the brake system can continue to be operated in this configuration, ensuring a braking effect, if the leak is located in the area that has now been separated. On the other hand, a further drop in the level suggests that the leak is not located in the area that was separated by the closing of the inlet valves of the second wheel brake group.

According to one or more embodiments, a diagnostic routine for determining a leak in the pressure provision device is carried out when the level falls below a third limit value, which is lower than the second limit value. The further drop in the level suggests that the leak is not located in an area that was separated by closing inlet valves (of the first or second wheel brake group). A possible leak in the area of the pressure provision device can then be determined by the diagnostic routine.

The master brake cylinder is optionally separably connected via an isolating valve to a brake supply line to which all the wheel brakes are connected and which is separably connected via an activation valve to the pressure provision device, wherein the inlet valves of all wheel brakes, the isolating valve and the activation valve are closed during the diagnostic routine and pressure is built up by the pressure provision device. By this means, hydraulic pressure is built up in the pressure chamber of the pressure provision device and in the line section between the pressure provision device and the activation valve. It can now be determined whether there is a further loss of pressure medium, in which case the leak is located in the pressure provision device.

The brake system is optionally operated in a first fallback operating mode if the diagnostic routine shows that there is a leak in the pressure provision device, wherein, in the first fallback operating mode, the pressure provision device is separated from all the wheel brakes, in particular by switching an activation valve, and the wheel brakes are actuated by pressure medium from the master brake cylinder. By this means, a further pressure medium loss due to the leak in the pressure provision device is prevented.

The brake system is particularly preferable operated in a second fallback operating mode if the diagnostic routine shows that there is no leak in the pressure provision device, wherein, in the second fallback operating mode, the wheel brakes are actuated by pressure medium from the pressure provision device, and the master brake cylinder is permanently separated from all the wheel brakes, in particular by switching an isolating valve. The reason for this is that, on the basis of the principle of exclusion, the leak is present in the area of the master brake cylinder if it is not located either in the area of the first wheel brake group, or in the area of the second wheel brake group, or in the area of the pressure provision device. A further pressure medium loss is thus prevented by separating the master brake cylinder. The braking performance is ensured by the pressure medium provision device.

Each wheel brake is optionally separably connected to the pressure medium reservoir tank via an outlet valve, and all the outlet valves are permanently closed during the second fallback operating mode. This prevents a further pressure medium loss via the leak in the area of the master cylinder.

The device for determining a level is optionally designed such that continuous values of the level are determined. The level is advantageously detected here by a sensor.

Alternatively, the device for determining a level is optionally designed such that a drop in the level below a predetermined value or a plurality of discrete predetermined values is determined. The device for determining a level advantageously comprises a plurality of sensors, each of which is designed to detect a drop in the level below a certain measuring point or to detect whether there is or is not pressure medium at a certain measuring point. Such sensors are generally less expensive than sensors that continuously detect a water level.

The embodiments also relate to a brake system which comprises a master brake cylinder actuable by a brake pedal, an electrically controllable pressure provision device, a pressure medium reservoir tank, which is in particular under atmospheric pressure and from which the master brake cylinder and the pressure provision device are supplied with pressure medium, at least two hydraulically actuable wheel brakes, at least one electrically actuable inlet valve per wheel brake, and a control unit which controls the operation of the brake system, wherein the wheel brakes are actuable either with pressure medium from the master brake cylinder or with pressure medium from the pressure provision device, wherein the pressure medium reservoir tank is equipped with a device for determining a level of the pressure medium, and the control unit activates the brake system in accordance with the method embodiments.

The master brake cylinder is optionally separably connected via an isolating valve to a brake supply line, to which all the wheel brakes are connected and which is separably connected via an activation valve to the pressure provision device.

The master brake cylinder optionally comprises a single pressure chamber which is hydraulically connected to the wheel brakes.

The invention claimed is:

1. A method for operating a brake system for motor vehicles, the brake system comprising a master brake cylinder actuatable by a brake pedal, an electrically controllable pressure provision device, a pressure medium reservoir tank, from which the master brake cylinder and the pressure provision device are supplied with pressure medium, and at least two hydraulically actuatable wheel brakes and at least one electrically actuatable inlet valve per wheel brake, the method comprising:
monitoring the pressure medium reservoir tank by a device for determining a level of the pressure medium, wherein the at least two hydraulically actuatable wheel brakes are divided into at least one first wheel brake group and one second wheel brake group;
closing inlet valves of the first wheel brake group among the at least one electrically actuatable inlet valve when the determined level falls below a first limit value; and
opening the inlet valves of the first wheel brake group and closing inlet valves of the second wheel brake group of the at least one electrically actuatable inlet valve when the level falls below a second limit value, which is lower than the first limit value.

2. The method as claimed in claim 1, wherein the at least two hydraulically actuatable wheel brakes comprises at least four wheel brakes, and
wherein the first wheel brake group comprises a first wheel brake and a second wheel brake of the at least four wheel brakes.

3. The method as claimed in claim 2, wherein the second wheel brake group comprises a third wheel brake and a fourth wheel brake of the at least four wheel brakes.

4. The method as claimed in claim 2, wherein the first wheel brake and the second wheel brake are arranged on opposite sides of the vehicle.

5. The method as claimed in claim 4, further comprising performing a diagnostic routine for determining a leak in the pressure provision device when the level falls below a third limit value, which is lower than the second limit value.

6. The method as claimed in claim 5, wherein the master brake cylinder is separably connected via an isolating valve to a brake supply line to which the at least four wheel brakes are connected and which is separably connected via an activation valve to the pressure provision device, and
wherein the inlet valves of the at least four wheel brakes, the isolating valve and the activation valve are closed during the diagnostic routine to pressurize the brake system.

7. The method as claimed in claim 5, further comprising operating the brake system in a first fallback operating mode if the diagnostic routine shows that there is a leak in the pressure provision device, and
wherein, in the first fallback operating mode, the pressure provision device is separated from the at least four wheel brakes.

8. The method as claimed in claim 7, wherein the pressure provision device is separated from the at least four wheel brakes by switching an activation valve, and the at least four wheel brakes are actuated by pressure medium from the master brake cylinder.

9. The method as claimed in claim 5, further comprising operating the brake system in a second fallback operating mode if the diagnostic routine shows that there is no leak in the pressure provision device, and
wherein, in the second fallback operating mode, the at least four wheel brakes are actuated by pressure medium from the pressure provision device, and the master brake cylinder is permanently separated from the at least four wheel brakes.

10. The method as claimed in claim 9, wherein the master brake cylinder is separated from the at least four wheel brakes by switching an isolating valve.

11. The method as claimed in claim 9, wherein each wheel brake among the at least four wheel brakes is separably connected to the pressure medium reservoir tank via an outlet valve, and each outlet valve is permanently closed in the second fallback operating mode.

12. The method as claimed in claim 9, wherein the monitoring comprises continuously monitoring values of the level of the pressure medium.

13. The method as claimed in claim 1, wherein the pressure medium reservoir tank is under atmospheric pressure.

14. A brake system comprising:
a master brake cylinder actuatable by a brake pedal;
an electrically controllable pressure provision device;
a pressure medium reservoir tank, which is under atmospheric pressure and from which the master brake cylinder and the pressure provision device are supplied with pressure medium;
a sensor for determining a level of the pressure medium;
at least two hydraulically actuatable wheel brakes;
at least one electrically actuatable inlet valve per wheel brake; and
a control unit which controls the operation of the brake system,
wherein the wheel brakes are actuatable either with pressure medium from the master brake cylinder or with pressure medium from the pressure provision device, and
wherein the control unit is configured to control to close inlet valves of a first wheel brake group among the at least one electrically actuatable inlet valve when the level falls below a first limit value, and open the inlet valves of the first wheel brake group and close inlet valves of the second wheel brake group of the at least one electrically actuatable inlet valve when the level falls below a second limit value, which is lower than the first limit value.

15. The brake system as claimed in claim 14, wherein the at least two hydraulically actuatable wheel brakes comprises at least four wheel brakes, and
wherein the first wheel brake group comprises a first wheel brake and a second wheel brake of the at least four wheel brakes.

16. The brake system as claimed in claim 14, wherein the master brake cylinder is separably connected via an isolating valve to a brake supply line, to which the at least four wheel brakes are connected and which is separably connected via an activation valve to the pressure provision device.

17. The brake system as claimed in claim 16, wherein the first wheel brake group comprises a first wheel brake and a second wheel brake of the at least four wheel brakes.

18. The brake system as claimed in claim 14, wherein the master brake cylinder comprises a single pressure chamber which is hydraulically connected to the at least four wheel brakes.

\* \* \* \* \*